US008712462B2

(12) United States Patent
Madan et al.

(10) Patent No.: US 8,712,462 B2
(45) Date of Patent: Apr. 29, 2014

(54) DOWNLINK SCHEDULING IN FRACTIONAL FREQUENCY REUSE (FFR) SYSTEMS

(75) Inventors: Ritesh Kumar Madan, San Diego, CA (US); Siddharth Ray, San Diego, CA (US); Niranjan N. Ratnakar, San Diego, CA (US); Arnab Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 12/819,191

(22) Filed: Jun. 19, 2010

(65) Prior Publication Data

US 2011/0312360 A1 Dec. 22, 2011

Related U.S. Application Data

(60) Provisional application No. 61/227,633, filed on Jul. 22, 2009.

(51) Int. Cl.
*H04W 52/34* (2009.01)
*H04W 72/12* (2009.01)

(52) U.S. Cl.
USPC ............................ 455/522; 455/454; 455/447

(58) Field of Classification Search
None
See application file for complete search history.

(56) References Cited

U.S. PATENT DOCUMENTS 7,653,122 B2 * 1/2010 Siriwongpairat et al. 455/522 X
2008/0057934 A1 3/2008 Sung et al.
2008/0176577 A1 * 7/2008 Bourlas et al. ................ 455/454
2009/0003266 A1 1/2009 Stolyar et al.
2009/0069026 A1 3/2009 Cho et al.

FOREIGN PATENT DOCUMENTS

EP 1895795 3/2008

OTHER PUBLICATIONS

International Search Report and Written Opinion—PCT/US2010/042652—ISA-EPO—Oct. 29, 2010.
Shukry, S. M., et al., "Adaptive Fractional Frequency Reuse (AFFR) scheme for multi-cell IEEE 802.16e systems", High-Capacity Optical Networks and Enabling Technologies (HONET), 2009 6th International Symposium on, IEEE, Piscataway, NJ, USA, Dec. 28, 2009, pp. 96-102, XP031643726.
Taiwan Search Report—TW099124208—TIPO—May 23, 2013.
Wong, et al., "Multiuser OFDM With Adaptive Subcarrier, Bit, and Power Allocation," Oct. 1999, IEEE Journal on Selected Areas in Communications, vol. 17, No. 10, pp. 1747-1758.

* cited by examiner

*Primary Examiner* — Philip Sobutka
(74) *Attorney, Agent, or Firm* — Stanton Braden

(57) ABSTRACT

An apparatus and method are disclosed for determining the optimal bandwidth fractions for all the users in each frequency band in a wireless communication system to maximize the net sum of user utilities. User utilities are functions of average rates of users, where different averaging rules can be used for different users. The standard approach of computing an optimal scheduler strategy involves the solution of a convex optimization problem that has a complexity on the order of $O(N^3)$ for N flows. This approach is not feasible for online implementation having a large number of flows. The method of the present work employs an efficient computational algorithm that obtains the optimal bandwidth fractions in O(N) time. This feature makes the method suitable for implementation in wideband cellular systems like LTE (Long Term Evolution) and UMB (Ultra Mobile Broadband).

25 Claims, 5 Drawing Sheets

DOWNLINK SCHEDULING IN FRACTIONAL FREQUENCY REUSE (FFR) SYSTEMS

REFERENCE TO RELATED APPLICATION

This patent application claims priority to U.S. Provisional Patent Application Ser. No. 61/227,633 that was filed on Jul. 22, 2009 and assigned to the assignee hereof, and is hereby expressly incorporated by reference herein.

BACKGROUND

1. Field

The present work relates generally to wireless communications systems, methods, computer program products and devices, and more specifically to techniques for efficient fractional frequency reuse in wireless communications systems.

2. Background

In a Fractional Frequency Reuse (FFR) cellular system, data can be transmitted to each wireless mobile unit over one of many multiple frequency sub-bands in which each sub-band may have a different effective spectral efficiency. Moreover, these effective spectral efficiencies can vary over time due to channel fading. In such systems, it is important to allocate the spectral resources intelligently to the users in order to maximize the net benefit of these resources to all users. In particular, a good scheduling policy will have properties that (1) allocate spectral resources to a user for which the channel gains on some of the frequency bands are close to their peaks, (2) for a given user, allocate resources on frequency bands with higher channel gains, rather than lower channel gains, and (3) ensure fairness between the different users by making sure that no user is deprived of service for an undue amount of time.

For example, consider the operation of a wireless communications network. FIG. 1 illustrates a portion of a wireless communications network that comprises a first wireless base station 110 (designated ENB1) and a second wireless base station 120 (designated ENB2). FIG. 1 also illustrates a first mobile unit 130 (designated UE1) and a second mobile unit 140 (designated UE2) that are located between the first base station 110 and the second base station 120. The first mobile unit 130 is located near an edge (not shown) of the wireless cell that is centered on the first wireless base station 110. The second mobile unit 140 is located near an edge (not shown) of the wireless cell that is centered on the second wireless base station 120.

The mobile unit 130 receives wireless transmissions from (and sends wireless transmissions to) the first wireless base station 110 on wireless link 150. The mobile unit 140 receives wireless transmissions from (and sends wireless transmissions to) the second wireless base station 120 on wireless link 160.

In addition, the mobile unit 130 receives interfering wireless transmissions from the second wireless base station 120. The "out of cell" interference that is received by the mobile unit 130 from the second wireless base station 120 is shown in FIG. 1 as wireless link 170. Similarly, the mobile unit 140 receives interfering wireless transmissions from the first wireless base station 110. The "out of cell" interference that is received by the mobile unit 140 from the first wireless base station 110 is shown in FIG. 1 as wireless link 180. The mobile units (e.g., first mobile unit 130 and second mobile unit 140) that are located near the edges of wireless cells receive significant "out of cell" interference if the wireless base stations (e.g., first wireless base station 110 and second wireless base station 120) transmit at maximum power.

In a Fractional Frequency Reuse (FFR) cellular system the "out of cell" interference can be minimized by employing an FFR method that transmits data to each mobile unit over one of many multiple frequency sub-bands, in which each sub-band may have a different effective spectral efficiency. The FFR method reserves some resources for the "out of cell" mobile units at each of the wireless mobile stations. In general, the available bandwidth (BW) is divided into a number of sub-bands. Each mobile unit is served at a different Signal to Interference/Noise Ratio (SINR) on each sub-band.

FIG. 2 illustrates how bandwidth at a base station can be subdivided into multiple sub-bands in a fractional frequency reuse (FFR) method. The bandwidth at the first wireless base station 110 (ENB1) is represented in FIG. 2 as a rectangle 210. The rectangle 210 may also be referred to as the bandwidth 210. The bandwidth frequency in the diagram increases from the bottom of rectangle 210 to the top of rectangle 210. The bandwidth at the second wireless base station 120 (ENB2) is represented in FIG. 2 as a rectangle 220. The rectangle 220 may also be referred to as the bandwidth 220. The bandwidth frequency in the diagram increases from the bottom of rectangle 220 to the top of rectangle 220.

In the Fractional Frequency Reuse (FFR) method, the bandwidth 210 and the bandwidth 220 are both divided into a number of sub-bands. A scheduler (not shown in FIG. 2) in each of the wireless base stations schedules the sub-bands of its respective bandwidth to the mobile units that are in wireless communication with the wireless base station. For example, the scheduler of the first wireless base station 110 may assign the sub-band of the bandwidth 210 that is designated with the reference numeral 230 to the mobile unit 130. The scheduler of the second wireless base station 120 may also assign the sub-band of the bandwidth 220 that is designated with the reference numeral 240 to the mobile unit 130. In this manner bandwidth resources are assigned to the mobile unit 130 at both of the wireless base stations 110 and 120.

The scheduler of the first wireless base station 110 assigns other sub-bands of the bandwidth 210 to other mobile units (not shown). The scheduler of the second base station 120 assigns other sub-bands of the bandwidth 220 to other mobile units (not shown). Each of the multiple frequency sub-bands may have a different effective spectral efficiency. The scheduler determines the bandwidth fractions for all of the mobile units in each frequency band in order to try to maximize the net sum of user utilities. User utilities are functions of the average rates of the users, where different averaging rules can be used for different users.

There is a need in the art for a frequency allocation scheduler that is able to maximize the net sum of user utilities by computing optimal bandwidth fractions for all the users in each frequency band.

SUMMARY

The present work discloses an apparatus and method for determining the optimal bandwidth fractions for all the users in each frequency band in a wireless communication system to maximize the net sum of user utilities. The method of the present work employs an efficient computational algorithm that obtains the optimal bandwidth fractions in O(N) time. The apparatus for performing the spectral allocation (1) divides a bandwidth into multiple sub-bands, and (2) determines a value of transmission power for the wireless link, and (3) assigns one of the multiple sub-bands of the bandwidth to the wireless link based on the value of the transmission power of the wireless link.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
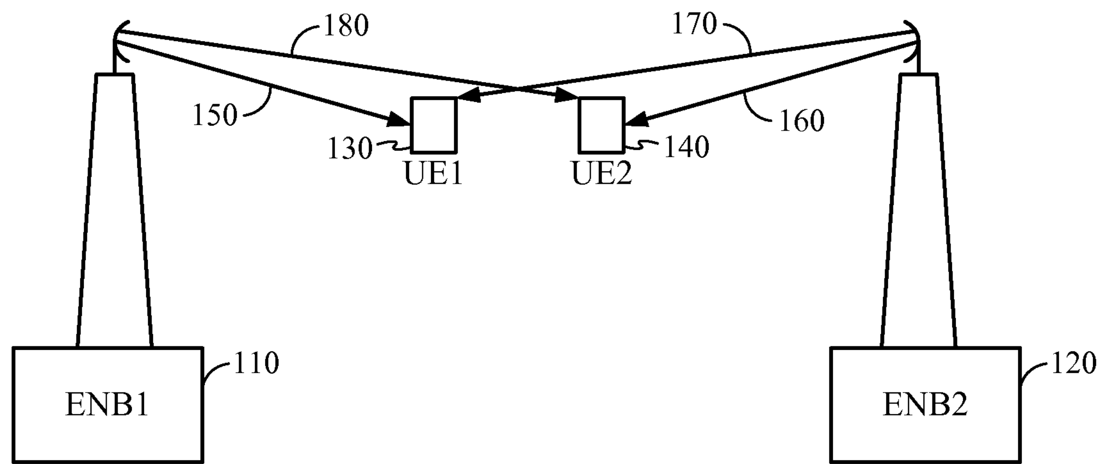
FIG. 1 illustrates a portion of wireless communications network that comprises two exemplary base stations and two exemplary mobile units.
Figure 2:
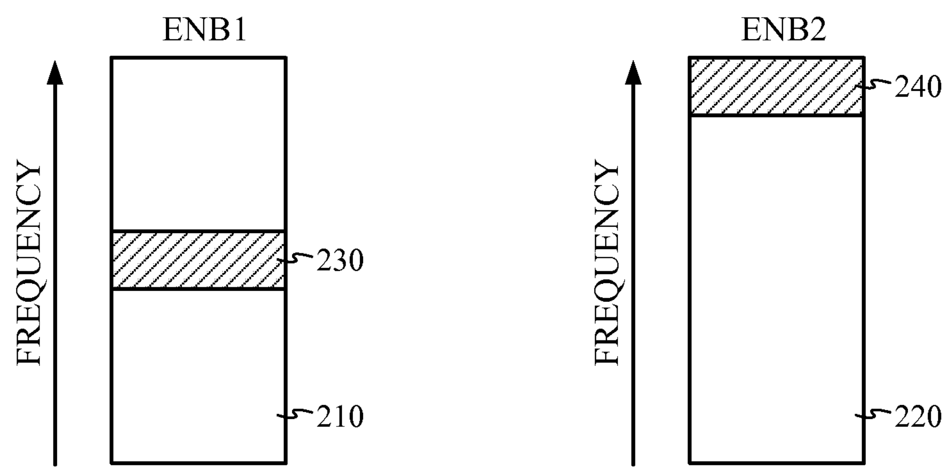
FIG. 2 illustrates bandwidth at a base station can be subdivided into multiple sub-bands in a fractional frequency reuse (FFR) method.
Figure 3:
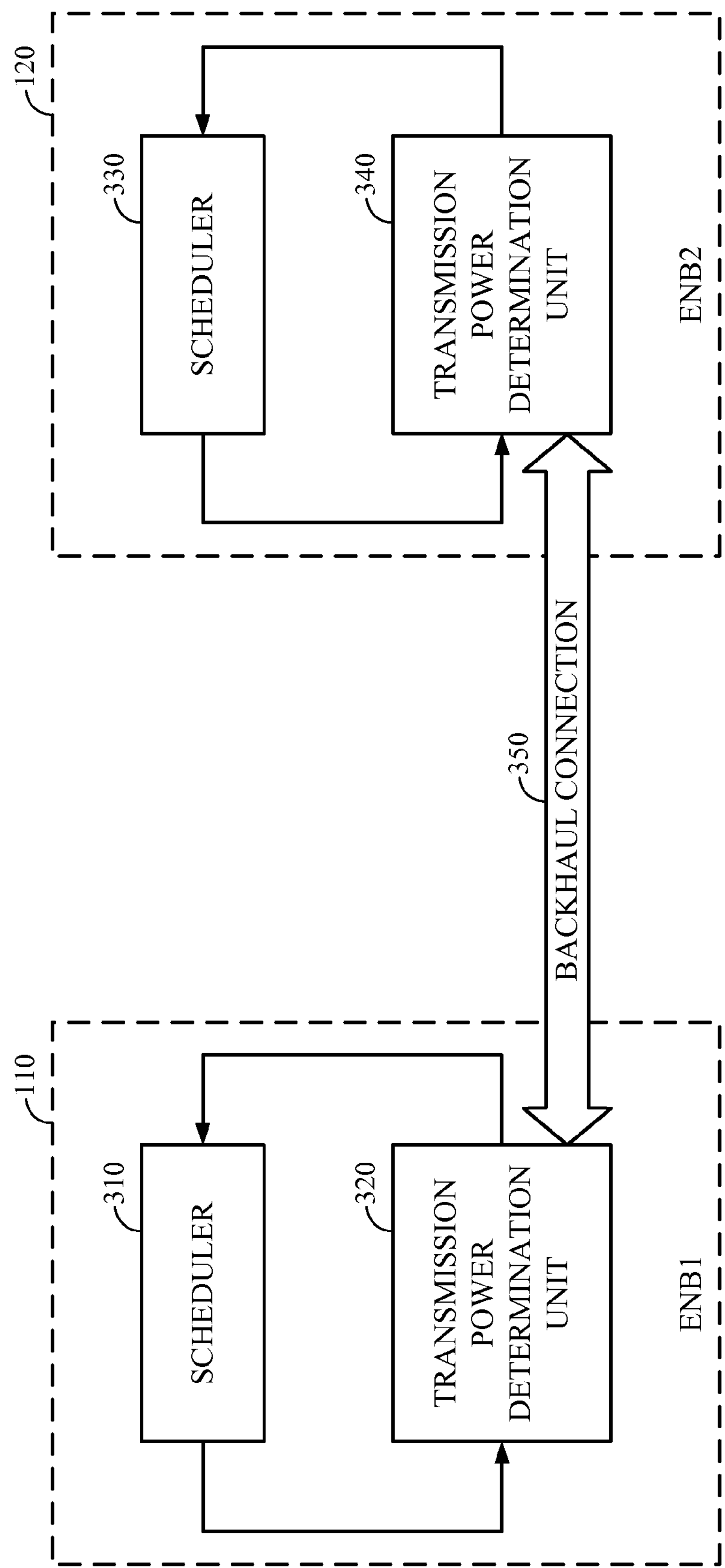
FIG. 3 illustrates a portion of two base stations each of which comprises a scheduler and a transmission power determination unit in accordance with the principles of the present work.

FIG. 3 illustrates a portion of two base stations each of which comprises a scheduler and a transmission power determination unit in accordance with the principles of the present work. A portion of the first wireless base station 110 (designated ENB1) comprises a scheduler 310 and a transmission power determination unit 320. The scheduler 310 comprises hardware elements and software elements that allocate the spectral resources of the sub-bands of the bandwidth 210 of the first wireless base station 110. Similarly, a portion of the second wireless base station 120 (designated ENB2) comprises a scheduler 330 and a transmission power determination unit 340. The scheduler 330 comprises hardware elements and software elements that allocate the spectral resources of the sub-bands of the bandwidth 220 of the second wireless base station 120.

The transmission power determination unit 320 of the first wireless base station 110 and the transmission power determination unit 340 of the second wireless base station 120 are connected by and communicate through a backhaul connection 350. The transmission power determination unit 320 and the transmission power determination unit 340 exchange information concerning the transmission (TX) power level of each of the sub-bands in their respective bandwidths. In one advantageous embodiment of the present work, the exchange of information may be accomplished using an X2 logical interface of the LTE (Long Term Evolution) Standard. The LTE Standard is a fourth generation (4G) mobile broadband standard for wireless communication systems.

First consider the scheduler 310. The scheduler 310 allocates (or schedules) spectral resources across multiple sub-bands in the first wireless base station 110 in which each sub-band may be operated at a different transmission power than the transmission power of the other sub-bands. That is, each sub-band may be operated at its own particular value of transmission power without regard to the values of transmission power of the remaining sub-bands in the bandwidth. The scheduler 310 receives the value of the transmission power for each of the sub-bands from the transmission power determination unit 320.

The scheduler 310 also provides feedback information to the transmission power determination unit 320. As will be discussed more fully below, the information that the scheduler 310 is able to feed back to the transmission power determination unit 320 comprises more than just standard total traffic load information. For example, the feedback information from the scheduler 310 may comprise (1) average rates of service, (2) queue lengths (average, median, percentile), (3) head of line delays (average, median, percentile), (4) marginal utility at the time of scheduling (average, median, percentile), and (5) a value of unit bandwidth to a user at the time scheduling, and (6) a measure of how "starved" flows become before being scheduled. The feedback information from the scheduler 310 may be used by the transmission power determination unit 320 to determine the transmission power for the multiple sub-bands in the bandwidth 210.

Similarly, the scheduler 330 allocates (or schedules) spectral resources across multiple sub-bands in the second wireless base station 120 in which each sub-band may be operated at a different transmission power than the transmission power of the other sub-bands. That is, each sub-band may be operated at its own particular value of transmission power without regard to the values of transmission power of the remaining sub-bands in the bandwidth. The scheduler 330 receives the value of the transmission power for each of the sub-bands from the transmission power determination unit 340.

The scheduler 330 also provides feedback information to the transmission power determination unit 340. As in the previously described case of the scheduler 310, the information that the scheduler 330 is able to feed back to the transmission power determination unit 340 comprises more than just standard total traffic load information. The feedback information from the scheduler 330 may be used by the transmission power determination unit 340 to determine the transmission power for the multiple sub-bands in the bandwidth 220.

The scheduler 310 and the scheduler 330 each operate using a unique and novel scheduler method of the present work. That method will now be described. The term "$UE_i$" refers to the "$i^{th}$" mobile unit in a given wireless cell. The letter "j" refers to the resource (sub-band) within the wireless cell. The term "$b_i^j$" refers to the bandwidth that is allocated to the mobile unit "$UE_i$" in sub-band "j" in each sub-frame. The total bandwidth "$B^j$" for the "$j^{th}$" resource (sub-band) is given by the expression:

$$B^j = \sum_i b_i^j \qquad \text{Equation (1)}$$

There are multiple resource sets. The multiple resource sets are designated "1" through "R". There are also multiple bandwidths each of which is associated with one of the multiple resource sets. The multiple bandwidths are designated $B^1$ through $B^R$.

The term "$\gamma_i^j$" refers to a Signal to Interference/Noise Ratio (SINR) for resource "j" and "$UE_i$" within the wireless cell. The value of SINR is a function of transmission power, path loss, shadowing, frequency selective fading, etc. Given the values of the "$\gamma_i^j$" (SINRs), one seeks to determine the amount of bandwidth "$b_i^j$" to allocate to the "$UE_i$" in sub-band "j" in each sub-frame.

The rate "$r_i$" at which the "$i^{th}$" mobile unit "$UE_i$" transmits at time "t" over all sub-bands is given by the expression:

$$r_i = \sum_j K_i^j * b_i^j \quad \text{Equation (2)}$$

where "$K_i^j$" is the spectral efficiency that is achievable for the mobile unit "$UE_i$" in sub-band "j". The value of the "$K_i^j$" depends upon the value of the "$\gamma_i^j$" (SINR).

The method associates a utility function "$U_i(b_i)$" with each mobile unit "$UE_i$". The utility for a mobile unit "$UE_i$" increases as more bandwidth is assigned to the mobile unit "$UE_i$". The utility function "$U_i(b_i)$" may change over time. Standard metrics are encompassed by this definition. For example, standard metrics include concave increasing functions of average rate for best effort flows (e.g., FTP (File Transfer Protocol), HTTP (Hypertext Transfer Protocol). Standard metrics also include delay, queue length based priority metrics to provide QoS (Quality of Service) (e.g., prioritize flows based on head-of-line delay D or $D^2$).

The method of the present work maximizes a utility function "$U_i(r_i)$". Using Equation (1), the utility function "$U_i(r_i)$" to be maximized may be expressed as:

$$\sum_i U_i\left(\sum_j K_i^j * b_i^j\right) \quad \text{Equation (3)}$$

In many cases the utility function $U_i$ is a concave increasing function. For example, the utility function $U_i$ may be an average rate based utility for best efforts. Or the utility function $U_i$ may be a queue length base metric.

One can impose a constraint on the maximum bandwidth that is allocated to a mobile unit $UE_i$ so that the allocated bandwidth does not exceed the bandwidth that is needed to empty the buffer of packets that are pending transmission.

At each time "t" the method allocates the bandwidths $b_i^j$ to each mobile unit $UE_i$ on resource set "j" to maximize the expression:

$$\sum_i (1/\alpha_i)U_i\left[\alpha_i\left(\sum_j K_i^j(t) * b_i^j\right) + (1-\alpha_i)x_i(t-1)\right] \quad \text{Equation (4)}$$

where the term "$\alpha_i$" is a past rate parameter and the term "$x_i(t)$" is an average rate for the mobile unit $UE_i$. The average rate $x_i(t)$ is updated for each mobile unit $UE_i$ as follows:

$$x_i(t)=(1-\alpha_i)x_i(t-1)+\alpha_i*r_i(t) \quad \text{Equation (5)}$$

where $r_i(t)$ is the rate at which the mobile unit $UE_i$ transmits at time "t". The formulation that is set forth in Equation (4) and Equation (5) is a generalization of a scheduling framework for best effort flows without Fractional Frequency Reuse (FFR).

This presents a convex optimization problem that can be formulated as follows: Maximize the expression:

$$\sum_i (1/\alpha_i)U_i\left[\alpha_i\left(\sum_j K_i^j(t) * b_i^j\right) + (1-\alpha_i)x_i(t-1)\right] \quad \text{Equation (6)}$$

subject to the conditions:

$$\sum_i b_i^j = B^j, \text{ where } j = 1, \ldots, R \quad \text{Equation (7)}$$

and $$b_i^j \geq 0 \text{ where } i = 1, \ldots, N \text{ and } j = 1, \ldots, R \quad \text{Equation (8)}$$

General purpose interior point methods can solve this convex optimization problem in about thirty (30) to forty (40) iterations where each iteration has a complexity on the order of $O(N^3R^3)$ for N flows. This makes online implementation of this approach not feasible for a large number of N flows. The main complexity involved is that of inverting an NR by NR sized Hessian matrix.

The method of the present work solves the convex optimization problem by using a linear time algorithm that uses a primal barrier interior point to reduce the complexity of inverting the Hessian matrix from order $O(N^3R^3)$ for N flows to order (NR). The method of the present work defines a barrier function $\Psi(b, t)$ by the expression:

$$-t\sum_i (1/\alpha_i)U_i\left[\alpha_i\left(\sum_j K_i^j(t) * b_i^j\right) + (1-\alpha_i)x_i(t-1)\right] - \sum_i\sum_j \log(b_i^j) \quad \text{Equation (9)}$$

The value of "t" is increased, and for each value of "t" the following optimization problem is solved:

$$\text{Minimize the expression } \Psi(b, t) \quad \text{Equation (10)}$$

$$\text{Subject to } \sum_i b_i^j = B^j, \text{ where } j = 1, \ldots, R \quad \text{Equation (11)}$$

For high values of "t", solving the problem of Equation (10) and Equation (11) gives an approximate solution to the original problem (i.e., the problem of Equations (6), (7), (8)).

The problem of Equation (10) and Equation (11) is solved by minimizing the barrier function $\Psi(b, t)$ subject to the total bandwidth constraints using Newton's method. In each iteration of Newton's method, the vector "b" is updated as follows:

$$b=b+s\Delta b \quad \text{Equation (12)}$$

where the letter "s" represents the step length and the expression $\Delta b$ represents the Newton step. The value of the Newton step $\Delta b$ is obtained by solving the following equation:

$$\begin{bmatrix} \nabla^2\psi(b,t) & A^T \\ A & 0 \end{bmatrix}\begin{bmatrix} \Delta b \\ v \end{bmatrix} = \begin{bmatrix} -\nabla\psi(b,t) \\ 0 \end{bmatrix}, \quad A = [I \ \ I \ \ \ldots \ \ I] \quad \text{Equation (13)}$$

The step length "s" is chosen using a line search such that it minimizes the expression $$\Psi(b+s\Delta b,t) \quad \text{Equation (14)}$$

The Hessian matrix of the barrier function Ψ(b, t) has the following structure:

$$\nabla^2\psi(b,t) = \begin{bmatrix} M_1 & & \\ & \ddots & \\ & & M_N \end{bmatrix} \quad \text{Equation (15)}$$

where each $M_i$ is an R by R matrix. The Hessian matrix can be written as the sum of a diagonal matrix and a rank one matrix. One can solve for Δb by (1) eliminating Δb and solving for the dual variables in O(NR) time, and (2) using a matrix inversion lemma to recover Δb from the dual variables in O(NR) time. The details of the solution are similar to that for the problem formulation in a paper entitled "Fast Algorithms for Resource Allocation in Wireless Cellular Networks" by Ritesh Madan, Stephen P. Boyd, and Sanjay Lall to be published in the journal "Transactions on Networking."

In some cases the convex optimization problem may have a large measure of complexity. For example, a utility function that is based on delays may have a large measure of complexity. For such cases a computationally simpler heuristic may be devised that has the following features. First, all sub-bands are ordered from highest to lowest transmission power. Then for each $K_i^j b_i^j$ in a sub-band, an allocation is made to a mobile unit $UE_i$ with the highest value of $U_i(r_i)$. Then the transmission rate $r_i$ for the mobile unit $UE_i$ that is allocated is updated to reflect an increase in the rate allocation in a given subframe due to one iteration. Then pairwise exchanges of mobile unit $UE_i$ allocations are reviewed across the multiple sub-bands. If the net benefit is increased by a pairwise exchange, then the pairwise exchange of the mobile units $UE_i$ is performed.

The scheduler 310 uses the scheduler method described above to provide feedback information to the transmission power determination unit 320. As previously mentioned, the scheduler 310 feeds back to the transmission power determination unit 320 more than just standard total traffic load information. The scheduler 310 also feeds back information that comprises (1) average rates of service, (2) queue lengths (average, median, percentile), (3) head of line delays (average, median, percentile), (4) marginal utility at the time of scheduling (average, median, percentile), and (5) a value of unit bandwidth to a user at the time scheduling, and (6) a measure of how "starved" flows become before being scheduled. The feedback information from the scheduler 310 is used by the transmission power determination unit 320 to determine the transmission power for the multiple sub-bands in the bandwidth 210.

In an open loop mode of the LTE (Long Term Evolution) Standard certain thresholds of the quantities of the feedback information can be used to determine whether to increase or decrease transmission power on a sub-band. For example, if many flows get starved beyond a certain value (based on marginal utility), then the transmission power at the appropriate wireless base station may be increased on or more sub-bands.

In a closed loop mode of the LTE (Long Term Evolution) Advanced Standard certain quantities of the scheduler feedback information may be exchanged over a backhaul connection (e.g., backhaul connection 350) to determine the appropriate transmission power across cell boundaries.

The linear time algorithm enables the method of the present work to determine the appropriate allocation of frequencies for the multiple sub-bands of bandwidth within a time interval of approximately one millisecond ($10^{-3}$ second). This is a very fast rate compared with the rates that may be achieved by standard prior art methods. The scheduler method of the present work obtains the optimal bandwidth fractions in O(N) time. This means that the scheduler method of the present work provides an appropriate frequency allocation for the multiple sub-bands in very nearly real time.

Figure 4:
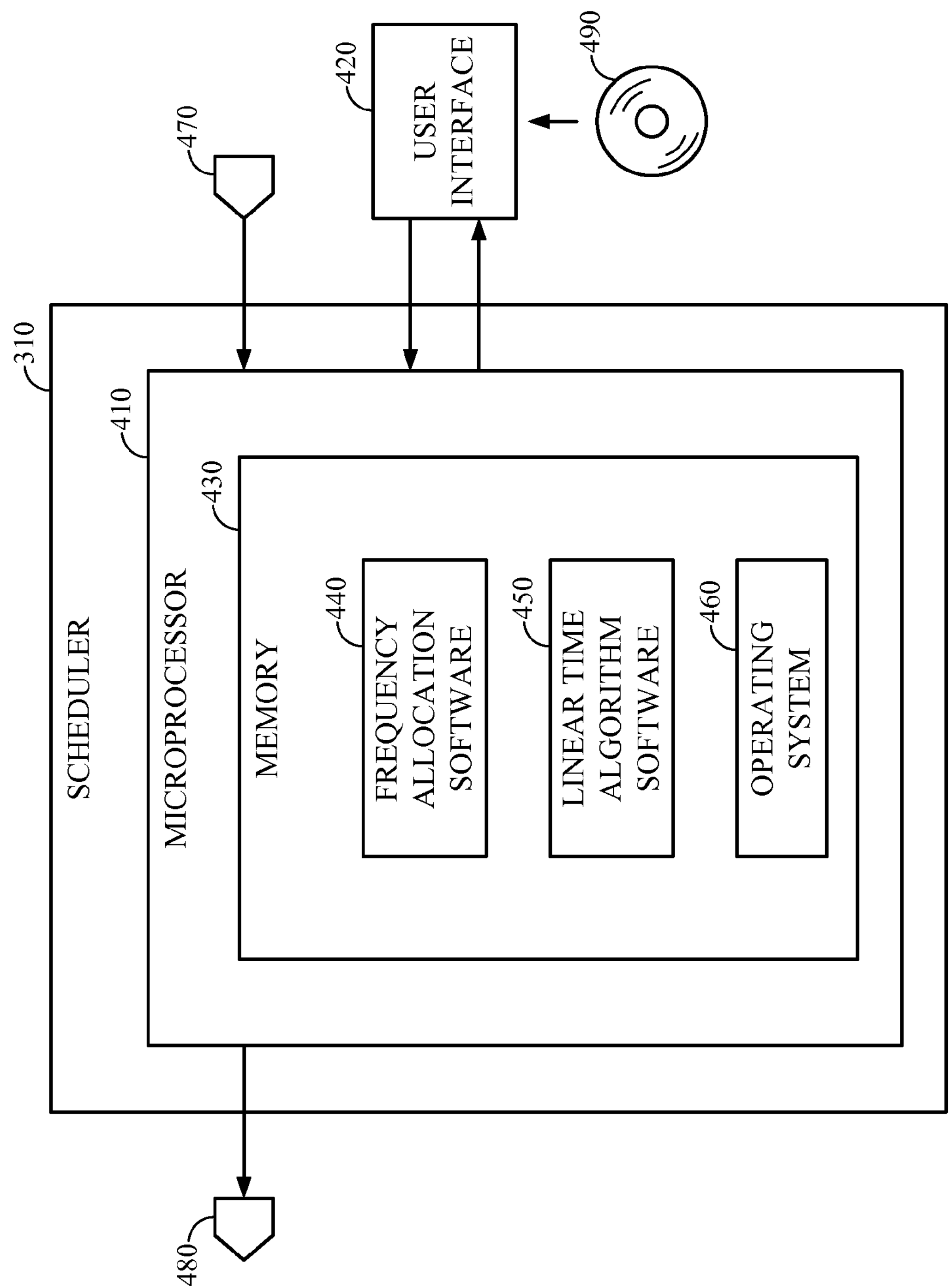
FIG. 4 illustrates a schematic diagram showing an advantageous embodiment of a scheduler of the present work.

FIG. 4 illustrates a schematic diagram showing an advantageous embodiment of scheduler 310 of the present work. The scheduler 310 comprises a microprocessor 410. A user interface unit 420 is connected to the microprocessor 410. The user interface unit 420 allows user access to the microprocessor 410 of the scheduler 310. The microprocessor 410 comprises a memory 430. The memory 430 comprises frequency allocation software 440, linear time algorithm software 450 and an operating system 460. The microprocessor 410 of the scheduler 310 receives information from the transmission power determination unit 430 (not shown in FIG. 4) via input node 470. The microprocessor 410 of the scheduler 210 sends information to the transmission power determination unit 430 (not shown in FIG. 4) via output node 480.

Together the microprocessor 410 and the frequency allocation software 440 and the linear time algorithm software 450 comprise a frequency allocation processor that is cable of carrying out the frequency allocation function for a wireless base station. The frequency allocation software 440 and the linear time algorithm software 450 carry out the method of the present work to allocate frequencies in very nearly real time in the manner that has been previously described.

The frequency allocation software 440 and the linear time algorithm software 450 comprise a computer program product for performing the scheduler method of the present work. The computer program product comprises a computer-readable medium that comprises code for carrying out computer instructions to perform the method. The computer program product is shown schematically in FIG. 4 as a computer-readable disk 490. The computer-readable disk 490 is merely illustrative of one type of computer program product. The computer program product may also comprise other types of computer-readable media such as magnetic tapes, hard drives, flash drives, and similar products.

Figure 5:
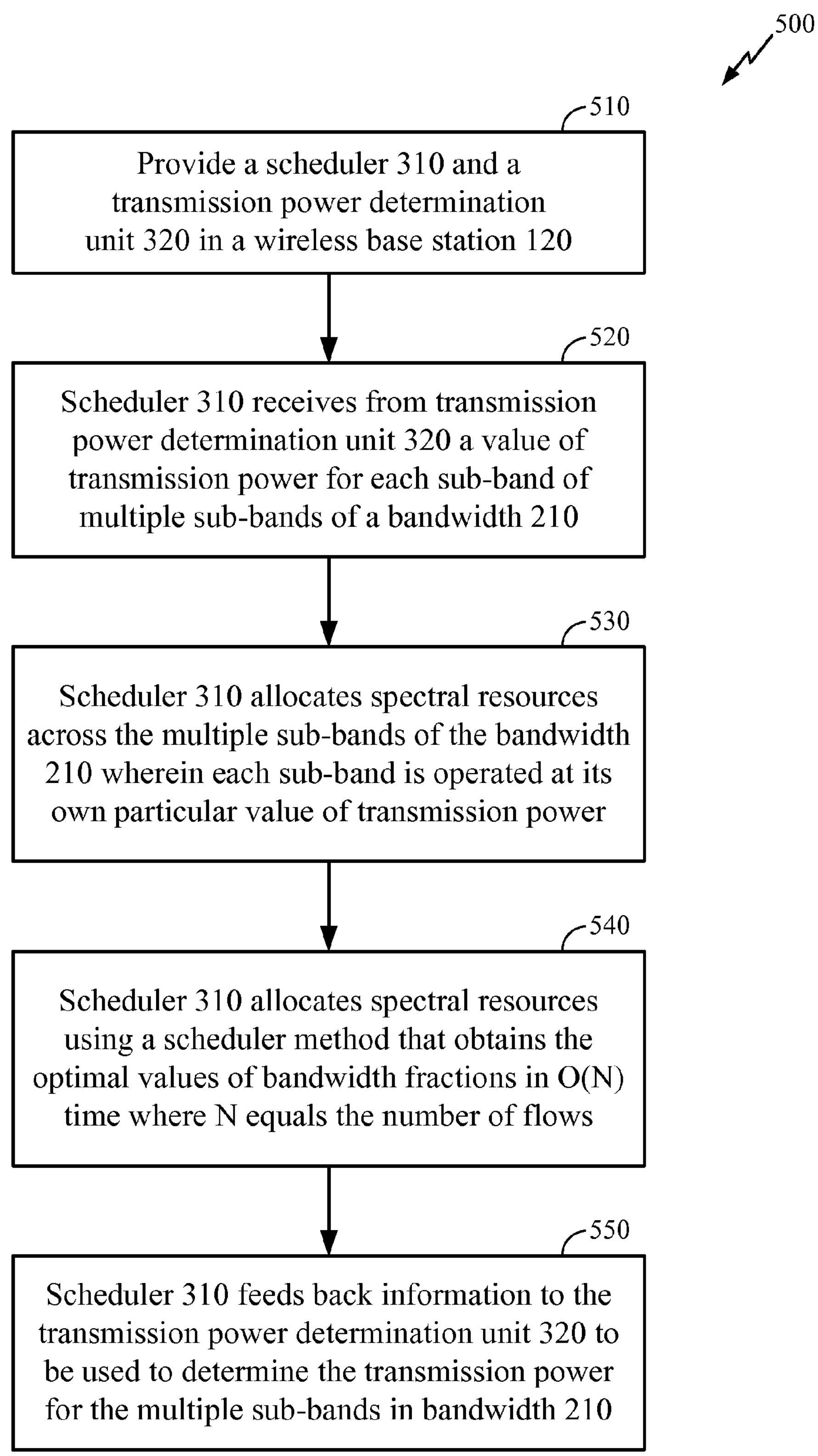
FIG. 5 illustrates a flow chart showing the steps of an advantageous embodiment of a scheduler method of the present work.

FIG. 5 illustrates a flow chart 500 that shows the steps of an advantageous embodiment of a scheduler method of the present work. A scheduler 310 and a transmission power determination unit 320 are provided in a wireless base station 120. An output of the transmission power determination unit 320 is provided to an input of the scheduler 310. An output of the scheduler 310 is provided to an input of the transmission power determination unit 320. (step 510). The scheduler 310 receives from the transmission power determination unit 320 a value of the transmission power for each sub-band of multiple sub-bands of a bandwidth 210 of the wireless base station 120. (step 520).

The scheduler 310 allocates spectral resources across the multiple sub-bands of the bandwidth 210 wherein each sub-band is operated at its own particular value of transmission power without regard to the values of transmission power of the other sub-bands in the bandwidth 210. (step 530). The scheduler 130 allocates spectral resources using a scheduler method that obtains the optimal values of bandwidth fractions in O(N) time where N equals the number of flows. (step 540). The scheduler 130 feeds back information to the transmission power determination unit 320 to use to determine the transmission power for the multiple sub-bands in the bandwidth 210. (step 550).

Figure 6:
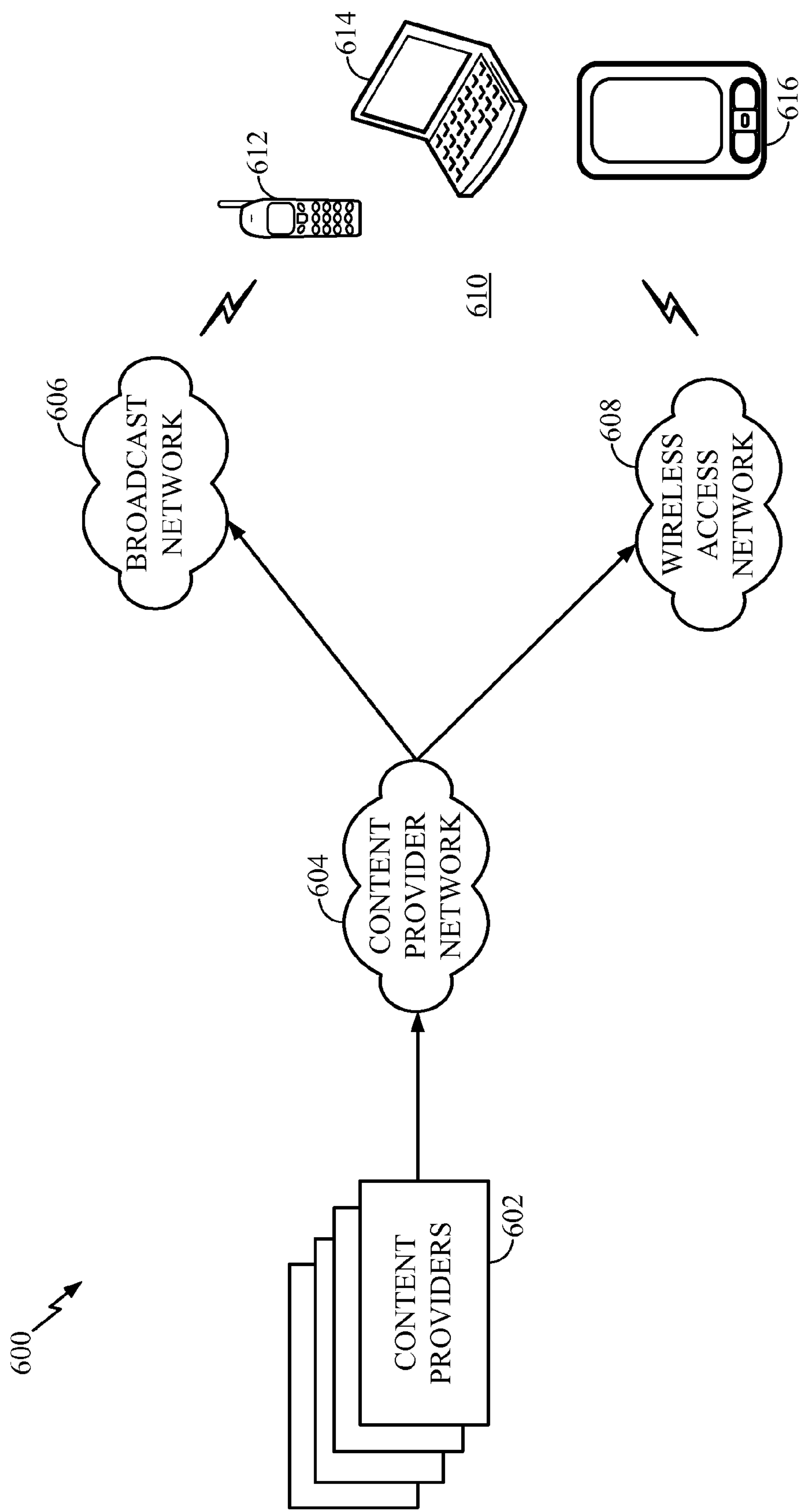
FIG. 6 illustrates a communications system in which principles according to the present work may be incorporated.

FIG. 6 illustrates a communications system 600 in which principles according to the present work may be incorporated. In general, the system 600 creates and broadcasts multimedia content across various networks to a large number of mobile subscribers. The communications system 600 includes any number of content providers 602, a content provider network 604, a broadcast network 606, and a wireless access network 608. The communications system 600 is also shown with a number of devices 610 used by mobile subscribers to receive multimedia content. These devices 610 include a mobile telephone 612, a person digital assistant (PDS) 614, and a laptop computer 616. The devices 610 illustrate just some of the devices that are suitable for use in the communications system 600. It should be noted that although three devices are shown in FIG. 6, virtually any number of analogous devices or types of devices are suitable for use in the communications system 600, as would be apparent to those skilled in the art.

The content providers 602 provide content for distribution to mobile subscribers in the communications system 600. The content may include video, audio, multimedia content, clips, real-time and non real-time content, scripts, programs, data or any other type of suitable content. The content providers 602 provide content to the content provider network for wide-area or local-area distribution.

The content provider network 604 comprises any combination of wired and wireless networks that operate to distribute content for delivery to mobile subscribers. In the example illustrated in FIG. 6, the content provider network 604 distributes content through a broadcast network 606. The broadcast network 606 comprises any combination of wired and wireless proprietary networks that are designed to broadcast high quality content. These proprietary networks may be distributed throughout a large geographic region to provide seamless coverage to mobile devices. Typically, the geographic region will be divided into sectors with each sector providing access to wide-area and local-area content.

The content provider network 604 may also include a content server (not shown) for distribution of content through a wireless access network 608. The content server communicates with a base station controller (BSC) (not shown) in the wireless access network 608. The BSC may be used to manage and control any number of base transceiver stations (BTSs) (not shown) depending on the geographic reach of the wireless access network 608. The BTSs provide access to wide-area and local-area for the various devices 610.

The multimedia content broadcast by the content providers 602 include one or more services. A service is an aggregation of one or more independent data components. Each independent data component of a service is called a flow. By way of example, a cable news service may include three flows: a video flow, an audio flow, and a control flow.

Services are carried over one or more logical channels. In Forward Link Only (FLO) Air Interface applications, a logical channel is often referred to as a Multicast Logical Channel (MLC). A logical channel may be divided into multiple logical sub-channels. These logical sub-channels are called streams. Each flow is carried in a single stream. The content for a logical channel is transmitted through the various networks in a physical frame. In Forward Link Only (FLO) Air Interface applications, the physical frame is often referred to as a superframe.

The air interface used to transmit the physical frames to the various devices 610 shown in FIG. 6 may vary depending on the specific application and the overall design constraints. In general, communications systems employing Forward Link Only (FLO) technology utilize Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside on an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the present work. Thus, the present work is not intended to be limited to the embodiments shown herein but is to be accorded the widest scope consistent with the principles and novel features disclosed herein.

What is claimed is:

1. A method for performing spectral allocation for a wireless link in a wireless communication system wherein the method comprises the steps of:

dividing a bandwidth into multiple sub-bands;

determining a value of transmission power for the wireless link;

assigning one or each of the multiple sub-bands of the bandwidth to the wireless link based on the value of the transmission power of the wireless link; and wherein a scheduler is used to assign one or each sub-band of the multiple sub-bands of the bandwidth to a wireless link of the plurality of wireless links based on the value of the transmission power for the wireless link to provide efficient fractional frequency reuse.

2. The method as set forth in claim 1 further comprising the step of:

assigning one of the multiple sub-bands of the bandwidth to the wireless link based on the value of the transmission power of the wireless link approximately once every millisecond.

3. The method as set forth in claim 1 further comprising the step of:

allocating to the wireless link an optimal value of a bandwidth fraction that is determined in O(N) time where the letter N represents a number of flows.

4. The method as set forth in claim 1 further comprising the step of:

assigning each sub-band of the multiple sub-bands of the bandwidth to a wireless link of the plurality of wireless links based on the value of transmission power for the wireless link approximately once every millisecond.

5. The method as set forth in claim 1 further comprising the step of:

allocating to the plurality of wireless links optimal values of bandwidth fractions that are determined in O(N) time where the letter N represents a number of flows.

6. The method as set forth in claim 1 further comprising the steps of:

using a transmission power determination unit to provide to a scheduler a value of transmission power for each wireless link of a plurality of wireless links; and using the scheduler to assign each sub-band of the multiple sub-bands of the bandwidth to a wireless link of the plurality of wireless links based on the value of transmission power for the wireless link.

7. The method as set forth in claim 1 further comprising the step of:

feeding back information from the scheduler to the transmission power determination unit to enable the transmission power determination unit to determine whether to increase or decrease transmission power on a sub-band.

8. The method as set forth in claim 7 wherein said information that the scheduler feeds back to the transmission power determination unit comprises one of:

traffic load information;

average rates of service;

queue lengths (average, median, percentile);

head of line delays (average, median, percentile);

marginal utility at the time of scheduling (average, median, percentile), a value of unit bandwidth to a user at the time scheduling; and a measure of how starved flows become before being scheduled.

9. The method as set forth in claim 1 further comprising the steps of:

solving a convex optimization problem by using a linear time algorithm that uses a primal barrier interior point that reduces the complexity of the convex optimization problem; and using the solution of the convex optimization problem to assign each sub-band of the multiple sub-bands of the bandwidth to provide efficient fractional frequency reuse.

10. The method as set forth in claim 9 wherein the linear time algorithm defines a barrier function Ψ(b, t) by the expression:

$$-t\sum_i (1/\alpha_i)U_i\left[\alpha_i\left(\sum_j K_i^j(t)*b_i^j\right)+(1-\alpha_i)x_i(t-1)\right]-\sum_i\sum_j \log(b_i^j)$$

and minimizes the barrier function subject to $\Sigma=b_i^{j\prime}$, where j=1, . . . , R where the represent bandwidth fractions and $B^j$ represents the bandwidth for a "$j^{th}$" resource and R represents a number of resource sets.

11. The method as set forth in claim 10 wherein the linear time algorithm employs a computationally simpler heuristic that performs the following steps:

orders all sub-bands from highest to lowest transmission power;

for each $K_i^j b_i^j$ in a sub-band, makes an allocation to a mobile unit $UE_i$ that has a highest value of $U_i(r_i)$;

updates the transmission rate $r_i$ for the mobile unit $UE_i$ that is allocated to reflect an increase in the rate allocation in a given subframe due to one iteration;

reviews pairwise exchanges of mobile unit $UE_i$ allocations across multiple sub-bands; and performing a pairwise exchange of the mobile units $UE_i$ when the net benefit is increased by a pairwise exchange.

12. An apparatus for performing spectral allocation for a wireless link in a wireless communication system wherein the apparatus comprises:

means for dividing a bandwidth into multiple sub-bands;

means for determining a value of transmission power for the wireless link;

means for assigning one or each of the multiple sub-bands of the bandwidth to the wireless link based on the value of the transmission power of the wireless link; and scheduling means to assign one or each sub-band of the multiple sub-bands of the bandwidth to a wireless link of the plurality of wireless links based on the value of the transmission power for the wireless link to provide efficient fractional frequency reuse.

13. The apparatus as set forth in claim 12 further comprising:

means for determining a value of transmission power for each wireless link of a plurality of wireless links; and means for assigning each sub-band of the multiple sub-bands of the bandwidth to a wireless link of the plurality of wireless links based on the value of transmission power for the wireless link.

14. An apparatus as set forth in claim 13 further comprising:

means for assigning one of the multiple sub-bands of the bandwidth to the wireless link based on the value of the transmission power of the wireless link within a time period of one of: (1) within approximately one millisecond and (2) within O(N) time where the letter N represents a number of flows.

15. The apparatus as set forth in claim 13 further comprising:

a transmission power determination unit that provides a value of transmission power for each wireless link of a plurality of wireless links; and a scheduler that is coupled to and receives from the transmission power determination unit a value of transmission power for each wireless link of the plurality of wireless links and that assigns each sub-band of the multiple sub-bands of the bandwidth to a wireless link of the plurality of wireless links based on the value of transmission power for the wireless link.

16. The apparatus as set forth in claim 15 further comprising:

a feed back connection from the scheduler to the transmission power determination unit that enables the scheduler to feed back information to the transmission power determination unit to enable the transmission power determination unit to determine whether to increase or decrease transmission power on a sub-band.

17. The apparatus as set forth in claim 15 wherein the scheduler comprises a frequency allocation processor that solves a convex optimization problem by using a linear time algorithm that uses a primal barrier interior point that reduces the complexity of the convex optimization problem and that uses the solution of the convex optimization problem to assign each sub-band of the multiple sub-bands of the bandwidth.

18. The apparatus as set forth in claim 17 wherein the scheduler comprises:

a frequency allocation processor that solves a convex optimization problem by ordering all sub-bands from highest to lowest transmission power;

for each $K_i^j b_i^j$ in a sub-band, making an allocation to a mobile unit $UE_i$ that has a highest value of $U_i(r_i)$;

updating the transmission rate $r_i$ for the mobile unit $UE_i$ that is allocated to reflect an increase in the rate allocation in a given subframe due to one iteration;

reviewing pairwise exchanges of mobile unit $UE_i$ allocations across multiple sub-bands; and performing a pairwise exchange of the mobile units $UE_i$ when the net benefit is increased by a pairwise exchange.

19. A computer program product stored on a non-transitory computer readable medium for performing spectral allocation for a wireless link in a wireless communication system comprising:

a non transitory computer-readable medium comprising:

code for dividing a bandwidth into multiple sub-bands;

code for determining a value transmission power for the wireless link; and code for assigning one of the multiple sub-bands of the bandwidth to the wireless link based on the value of the transmission power of the wireless link; and code for a scheduler to assign one or each sub-band of the multiple sub-bands of the bandwidth to a wireless link of the plurality of wireless links based on the value of the transmission power for the wireless link to provide efficient fractional frequency reuse.

20. The computer program product as set forth in claim 19 wherein the computer-readable medium further comprises:

code for determining a value of transmission power for each wireless link of a plurality of wireless links; and code for assigning each sub-band of the multiple sub-bands of the bandwidth to a wireless link of the plurality of wireless links based on the value of transmission power for the wireless link.

21. The computer program product as set forth in claim 20 wherein the computer-readable medium further comprises:

code for assigning one of the multiple sub-bands of the bandwidth to the wireless link based on the value of the transmission power of the wireless link within a time period of one of: (1) within approximately one millisecond and (2) within O(N) time where the letter N represents a number of flows.

22. The computer program product as set forth in claim 20 wherein the computer-readable medium further comprises:

code for causing a transmission power determination unit to provide a value of transmission power for each wireless link of a plurality of wireless links; and code for causing a scheduler that is coupled to and receives from the transmission power determination unit a value of transmission power for each wireless link of the plurality of wireless links to assign each sub-band of the multiple sub-bands of the bandwidth to a wireless link of the plurality of wireless links based on the value of transmission power for the wireless link.

23. The computer program product as set forth in claim 22 wherein the computer-readable medium further comprises:

code for causing a frequency allocation processor to solve a convex optimization problem by using a linear time algorithm that uses a primal barrier interior point that reduces the complexity of the convex optimization problem; and code that uses the solution of the convex optimization problem to assign each sub-band of the multiple sub-bands of the bandwidth to provide efficient fractional frequency reuse.

24. The computer program product as set forth in claim 23 wherein the computer-readable medium further comprises:

code that uses the linear time algorithm to define a barrier function Ψ(b, t) by the expression:

$$-t\sum_i (1/\alpha_i)U_i\left[\alpha_i\left(\sum_j K_i^j(t) * b_i^j\right) + (1-\alpha_i)x_i(t-1)\right] - \sum_i\sum_j \log(b_i^j)$$

and that minimizes the barrier function subject to $$\Sigma b_i^j = B^j, \text{ where } j=1, \ldots, R$$

where the $b_i^j$ represent bandwidth fractions and $B^j$ represents the bandwidth for a "$j^{th}$" resource and R represents a number of resource sets.

25. The computer program product as set forth in claim 24 wherein the computer-readable medium further comprises:

code that orders all sub-bands from highest to lowest transmission power;

code that for each $K_i^j b_i^j$ in a sub-band, makes an allocation to a mobile unit $UE_i$ that has a highest value of $U_i(r_i)$;

code that updates the transmission rate $r_i$ for the mobile unit $UE_i$ that is allocated to reflect an increase in the rate allocation in a given subframe due to one iteration;

code that reviews pairwise exchanges of mobile unit $UE_i$ allocations across multiple sub-bands; and codes that performs a pairwise exchange of the mobile units $UE_i$ when the net benefit is increased by a pairwise exchange.

* * * * *